United States Patent
Brunou et al.

(10) Patent No.: US 8,983,711 B2
(45) Date of Patent: Mar. 17, 2015

(54) METHOD AND DEVICE FOR THE DETECTION OF A TRANSPORTED SITUATION OF A VEHICLE IN STANDBY MODE, AND VEHICLE EQUIPPED WITH SUCH A DEVICE

(75) Inventors: Alfred Brunou, Saint-Gemme-Moronval (FR); Stephane Nicolle, Montigny-le-Bretonneux (FR)

(73) Assignee: Renault S.A.S., Guyancourt (FR)

( * ) Notice: Subject to any disclaimer, the term of this patent is extended or adjusted under 35 U.S.C. 154(b) by 367 days.

(21) Appl. No.: 13/382,310

(22) PCT Filed: Jul. 5, 2010

(86) PCT No.: PCT/FR2010/051408
§ 371 (c)(1),
(2), (4) Date: Feb. 24, 2012

(87) PCT Pub. No.: WO2011/004107
PCT Pub. Date: Jan. 13, 2011

(65) Prior Publication Data
US 2012/0143396 A1    Jun. 7, 2012

(30) Foreign Application Priority Data
Jul. 6, 2009    (FR) ...................................... 09 54652

(51) Int. Cl.
*B60T 8/00*    (2006.01)
*B60T 8/88*    (2006.01)
*B60T 8/1755*    (2006.01)

(52) U.S. Cl.
CPC ............... *B60T 8/885* (2013.01); *B60T 8/1755* (2013.01); *B60T 2270/406* (2013.01); *B60T 2270/413* (2013.01)
USPC .............................. 701/29.7; 701/1; 701/29.1

(58) Field of Classification Search
CPC  G01M 17/00; G01M 17/007; G01M 17/0074
USPC ........ 701/29.1, 29.7, 30.2, 32.5, 32.9, 116, 1, 701/9.1
See application file for complete search history.

(56) References Cited

U.S. PATENT DOCUMENTS 6,158,826 A    12/2000  Yasuda
7,646,287 B2 *  1/2010  Hayashi et al. ............... 340/429
(Continued)

FOREIGN PATENT DOCUMENTS

DE           198 22 014         11/1998
DE     10 2005 015 062          2/2006
(Continued)

OTHER PUBLICATIONS

U.S. Appl. No. 13/382,604, filed Feb. 8, 2012, Brunou, et al.
(Continued)

*Primary Examiner* — John Q Nguyen
*Assistant Examiner* — Michael Whalen
(74) *Attorney, Agent, or Firm* — Oblon, McClelland, Maier & Neustadt, L.L.P.

(57) ABSTRACT

A method for detecting whether a vehicle on standby is in a transported situation, the vehicle including a course control device, wheel speed sensors, a yaw rate sensor, a processing unit processing data managing vehicle operation modes and a device for immobilizing the vehicle. The method includes detecting a vehicle standby mode after installing the vehicle on a transport support, detecting a zero vehicle speed using the wheel speed sensors, the speed sensor of at least one wheel able to be on the verge of oscillating over a predefined time period, detecting a non-zero yaw rate using the yaw rate sensor over a predefined time period, and under these conditions determining the vehicle is in a transported mode, in which data from at least the wheel speed sensor on the verge of oscillating is filtered, and allowing the vehicle to be put in a wake-up state.

15 Claims, 1 Drawing Sheet

(56) References Cited

U.S. PATENT DOCUMENTS

| | | | |
|---|---|---|---|
| 8,688,310 B2* | 4/2014 | Brunou et al. | 701/29.1 |
| 2007/0103279 A1* | 5/2007 | Hayashi et al. | 340/429 |
| 2008/0133079 A1 | 6/2008 | Dulac | |
| 2009/0158790 A1* | 6/2009 | Oliver | 70/202 |
| 2012/0158239 A1* | 6/2012 | Brunou et al. | 701/29.1 |

FOREIGN PATENT DOCUMENTS

| | | |
|---|---|---|
| DE | 10 2005 045 998 | 5/2006 |
| EP | 1 927 861 | 6/2008 |
| FR | 2 845 335 | 4/2004 |
| FR | 2 906 515 | 4/2008 |
| WO | 2008 003533 | 1/2008 |

OTHER PUBLICATIONS

French Search Report Issued Feb. 25, 2010 in FR 0954652 Filed Jul. 6, 2009.

International Search Report Issued Nov. 5, 2011 in PCT/EP10/51408 Filed Jul. 5, 2010.

\* cited by examiner

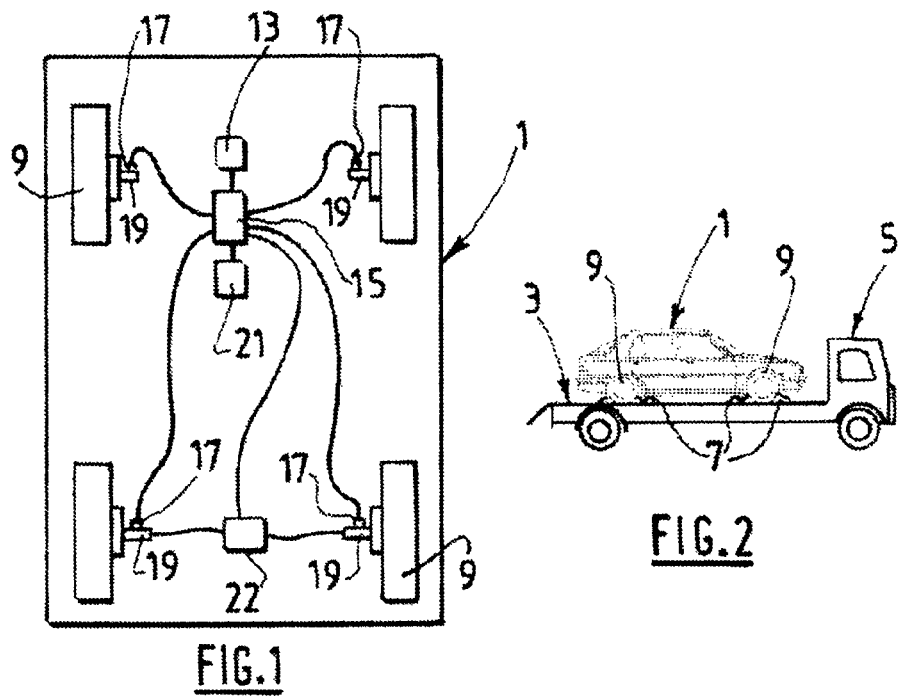
FIG.1
FIG.2
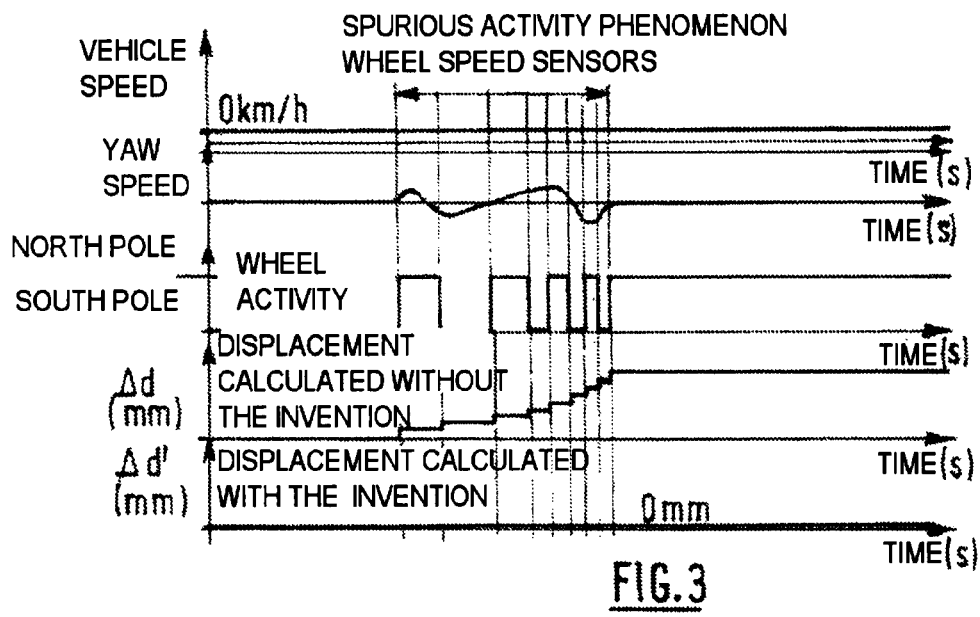
FIG.3

METHOD AND DEVICE FOR THE DETECTION OF A TRANSPORTED SITUATION OF A VEHICLE IN STANDBY MODE, AND VEHICLE EQUIPPED WITH SUCH A DEVICE

The invention relates to a method and device for detecting a transport situation of a vehicle in standby mode, and to a vehicle equipped with such a device.

When a vehicle is immobilized in standby mode, a system monitors the activity of the wheel speed sensors in order to check, inter alia, that the vehicle is correctly immobilized before the latter is switched off. When the vehicle is equipped with a course control system, for example of E.S.C. (vehicle stability control) type and when movements are detected via the wheel speed sensors, said course control system informs the immobilizing device accordingly: inducing either an immobilizing of the vehicle by means of an increase in the tightening forces of the immobilizing device (parking brake) or dedicated alerts/defects. This essential monitoring reaches its limits in transport, where the vehicle may seem to be displaced relative to the transport carrier without in any way actually being displaced. This is because, during transport, spurious activities of the wheel speed sensors may be wrongly generated and thus the immobilizing device may be required to increase the tightening forces of the immobilizing device, thus possibly resulting in defects requiring a diagnostic-based technical intervention.

The object of the invention is therefore to avoid unnecessary tightening actions of the immobilizing device and/or untimely vehicle alerts or defects following transportation.

According to the invention, there is proposed a method for detecting a transport situation of a vehicle in standby mode, the vehicle including a course control device, wheel speed sensors and a vehicle yaw speed sensor linked to said course control device of the vehicle, a detected information processing unit, of on-board computer type, managing in particular modes of operation of the vehicle, such as vehicle switched off, on standby, ready to start, starting or engine started, characterized in that it comprises the following steps:

- detecting a standby mode of operation of the vehicle when stopped following the installation of the vehicle fixed on a transport carrier,
- detecting a zero speed of the vehicle, recorded by the wheel speed sensors of the vehicle following said installation of the vehicle on the transport carrier, the speed sensor of at least one wheel of the vehicle being at the point of oscillation, over a predefined time period,
- detecting a non-zero yaw speed of the vehicle, recorded by the yaw speed sensor of the vehicle, corresponding to a slight relative movement of the vehicle fixed on its carrier, over a predefined time period,
- under these conditions, determining a transport mode of the vehicle, in which said course control device orders the filtering of the information from at least one wheel speed sensor of a vehicle, and
- allowing for an exit from the transport mode of the vehicle.

The method applies to various vehicle transport situations, for example to road transport on a truck, rail transport, transport on a ferry, impounding of the vehicle, etc., and, in this transport situation, makes it possible to have the vehicle in a mode inhibiting displacement monitoring of the vehicle on its transport carrier and the minimum thus avoiding it being set to defect mode.

Naturally, the standby mode of the vehicle remains for a determined time period after the vehicle is stopped.

Said time period may be of the order of from a few minutes to sixty minutes.

Said predefined time period for detecting the zero speed of the vehicle is of the order of the a few seconds, for example from one to three seconds.

Said predefined time period of the non-zero yaw speed of the vehicle is of the order of one second, even a few seconds, for example from one to several seconds, and may be substantially the same as that of the detection of the zero speed of the vehicle. Said time period may correspond to a turning vehicle transport situation.

The device for detecting a transport situation of a vehicle in standby mode for implementing the method defined previously comprises vehicle wheel speed sensors, a vehicle yaw speed sensor, a vehicle course control device, for example of E.S.C. (vehicle stability control) type, an information processing unit of computer type on board the vehicle suitable for managing in particular modes of operation of the vehicle, such as vehicle switched off, on standby, ready to start, starting or engine started, and is characterized in that it comprises means suitable for placing the vehicle in a transport mode in which the information from said wheel speed sensor at the point of oscillation is filtered, and for enabling the vehicle to be switched on again, for example when a door is opened or when said vehicle is moved, etc.

Said means suitable for placing the vehicle in a transport mode are advantageously a software element added to the software of the course control device of the vehicle.

The invention also relates to a vehicle comprising a device for a vehicle in standby mode as mentioned above.

The invention is illustrated hereinbelow using an exemplary nonlimiting embodiment of the invention and with reference to the appended drawing in which:

FIG. 1 is a schematic view of the components of a device for detecting a transport situation of a motor vehicle according to the invention, FIG. 2 is an elevation view of a motor vehicle according to the invention in a transport situation on a deck of a transport vehicle, and FIG. 3 is a graph of the signals from the wheel speed, yaw speed and vehicle displacement sensors in a transport situation for a motor vehicle according to the invention and a vehicle without the invention.

With reference to the drawings, and in particular to FIG. 2, a motor vehicle 1 according to the invention in a transport situation is represented. This vehicle is mounted on a deck 3 of a transport vehicle 5, a truck, being fixed thereto by means of front and rear chocks 7 positioned against its wheels 9 on the deck 3.

In addition to the chocking of the vehicle, said vehicle is placed in a parking brake situation, by the vehicle immobilizing device 22. It may be that the vehicle is badly chocked on its transport carrier and moves slightly thereon, for example from 0.5 to a few centimeters at the most turbulent transport moments, notably if the parking brake is badly tightened.

During transport, notably during turning, the motor vehicle 1 moves slightly on the deck 3 and in particular undergoes a yaw movement, which is detected by the yaw speed sensor 13 of the vehicle (FIG. 1).

This motor vehicle 1 is also provided with a vehicle course control device 15, of E.S.C. (vehicle stability control) type. The vehicle also comprises wheel speed sensors 17 each mounted on a wheel axle 19 of the vehicle and linked to the course control device 15, which is in turn linked to a computer 21 on board the vehicle and to the vehicle immobilizing device 22. Similarly, the yaw speed sensor 13, mounted inside the vehicle, is linked to the course control device 15.

It is possible in this transport situation that one of the wheel speed sensors 17, which are generally of the magnetic pole detection type, are at the point of oscillation between two distinct and successive magnetic poles and that the slight movement of the vehicle 1 chocked on the deck 3 generates on this sensor pulses which correspond to the oscillation from one pole to the other on the movement of the wheel 9. This probability of point of oscillation of a speed sensor 17 for a wheel is low, of the order of 0.02 to 0.04, but it is not negligible. It may also concern two wheels 9 of the vehicle with a very low probability, of the order of 0.0004, or more than two wheels 9.

In this case, for a vehicle without the device of the invention but equipped with an E.S.C. (vehicle stability control) device 15, said device will wrongly inform the vehicle immobilizing device 22 causing the latter to produce parking brake tightening forces up to the maximum tightness, then, with the vehicle seeming to continue to move on its carrier during transport, will cause, on the part of the vehicle immobilizing device 22, defects requiring a diagnostic-based technical intervention.

The invention provides a solution to this problem regarding modern motor vehicles in a transport situation.

The invention in fact relates to the motor vehicles that include (FIG. 1) wheel speed sensors 17, a sensor 17 on each wheel, a vehicle yaw speed sensor 13, a vehicle course control device 15, of E.S.C. (vehicle stability control) type, and an information processing unit 21 of computer type on board the vehicle. The on-board computer 21 is linked to the course control device 15. The wheel speed sensors 17 and the yaw speed sensor 13 are linked to the course control device 15. The computer 21 on board the vehicle is suitable for managing and informing of the operation of the vehicle and notably various operating modes thereof, such as vehicle switched-off mode in which the vehicle is stopped with its control elements off and in a standby electric power supply mode, a vehicle standby mode in which essential control elements, such as the detection of a door being opened, the detection of movement of the vehicle, etc., are maintained, a vehicle ready-to-start mode in which the starting card or the vehicle contact key is detected, an engine starting mode in which the starting card or the contact key is activated, an engine started mode in which the corresponding driving and control functions are activated.

The invention consists in detecting, for a vehicle 1 in standby mode, a transport situation in which it may be that at least one wheel speed sensor 17, which has a probability of approximately 0.02, or two wheel speed sensors 17, which have a probability of approximately 0.0004, is or are in a point of oscillation situation and therefore generating a spurious signal at certain transport moments, during random time periods. The method according to the invention consists, in these conditions recognized by the E.S.C. (vehicle stability control) device 15, in filtering any wheel sensor 17 signal, which could come from said wheel sensor 17 at the point of oscillation, this filtering being controlled by the E.S.C. (vehicle stability control) device 15 to neutralize said signals emitted by this sensor 17. This signal inhibiting function is implemented by the addition of a software element in the program of this E.S.C. (vehicle stability control) device 15.

The implementation of the invention is illustrated by an exemplary embodiment described below.

It is assumed that an operator mounts a modern motor vehicle 1, equipped with an on-board computer 21, an E.S.C. (vehicle stability control) device 15, wheel speed sensors 17 and a vehicle yaw speed sensor 13, on a deck 3 of a transport vehicle 5 as represented in FIG. 1 and fixes it in position, for example by means of chocks 7 on the carrier deck 3. The vehicle 1 is in principle held locked on the deck of the transport vehicle 5 and cannot move relative thereto, unless it is stressed by the vibrations of the transport and very small relative movements on the deck 3 during transport. The vehicle is also in standby mode for a variable time period, from a few minutes to approximately 60 minutes depending on the static conditions of the vehicle at the moment when the latter is stopped on the deck 3. The operator starts his transport vehicle 5 and transports the vehicle 1 in this standby period of the vehicle 1; the transported motor vehicle 1 will be controlled by its E.S.C. (vehicle stability control) device 15 and in particular for its displacement and yaw movements by the wheel speed 17 and yaw speed 13 sensors respectively during transport.

If a wheel speed sensor 17, or possibly two wheel speed sensors 17, is/are at the point of oscillation, it may be that, with the very slight movement of the motor vehicle on the deck 3, that this/these wheel speed sensor(s) 17 delivers/deliver a spurious displacement signal at the most turbulent transport moments, for example over one to several seconds, then, over prolonged periods, for example from five to fifteen minutes in which the transport is more calm, it no longer delivers any. This situation will be recognized by the E.S.C. (vehicle stability control) device 15 as zero speed of the vehicle during said period of turbulence.

Furthermore, the yaw speed sensor 13 of the vehicle 1 will be required to react during transport, in particular in the turn situations, to emit a non-zero vehicle yaw speed signal, and to do so over a short period of time corresponding to the time of the turn, for example from one to several seconds. The detection of the yaw movement of the vehicle and that of the wheel or wheels at the point of oscillation of its sensor may be synchronized, but not necessarily.

The abovementioned conditions will be recognized by the E.S.C. (vehicle stability control) device 15 in the standby mode condition received from the on-board computer 21 as a transport situation of the motor vehicle 1 and thus said signal from said speed sensor(s) 17 at the point of oscillation is filtered so that no signal is emitted. Thus, the immobilizing device 22 does not order any tightening of the parking brake, or a setting of the vehicle to defect mode, in a transport situation of the vehicle, as is the case for a vehicle not equipped with the invention.

This situation is illustrated by FIG. 3 in which a graphic comparison is recorded between a vehicle 1 according to the invention and a vehicle not equipped with the invention during transport.

This graph expresses, as a function of time (on the x axis), respectively from top to bottom, the vehicle speed and vehicle yaw speed signals, the speed signals from a wheel speed sensor 17 at the point of magnetic oscillation, North pole to adjacent South pole, the displacement Δd of the vehicle 1 (in mm) calculated without the device of the invention and the calculated displacement Δd' (in mm) of the vehicle with the device of the invention.

The graph shows a turbulent transport episode over a short period of time (a few seconds) in which, respectively from top to bottom, there are observed a zero speed of the vehicle but with a spurious activity phenomenon on at least one of the wheel speed sensors (the one at the point of oscillation), a non-zero yaw speed of the vehicle in the same time period, the emission of wheel speed signals from the speed sensor at the point of oscillation over said period according to the rectangular signals corresponding to the alternation of oscillation of the successive poles of the wheel speed sensor 17, the corresponding calculated displacement Δd of a vehicle without the invention over said period, and the calculated displacement Δd' reset to zero over said period of a vehicle according to the invention.

Naturally, for the vehicle not equipped with the invention, the staircase-form calculated displacement is wrongly translated as a real displacement of the vehicle, which will result in a retightening of the parking brakes followed by a setting of the vehicle to defect mode ordered by the immobilizing device 22.

In the vehicle according to the invention, since the calculated displacement Δd' is rounded to zero, nothing will happen, except possibly the transition from the standby mode of the vehicle to a switched off mode after a certain time period after the transport mode has been detected, for example from ten to thirty minutes.

Naturally, at the end of the vehicle transport situation, when a door thereof is opened, or when the vehicle really moves, the vehicle exits from the transport mode.

The invention thus provides a simple method and device for detecting a vehicle in a transport situation, making it possible to prevent the latter from being set to defect mode during this situation.

The invention claimed is:

1. A method for detecting a transport situation of a vehicle in a standby mode of operation, the vehicle including a course control device, wheel speed sensors and a vehicle yaw speed sensor connected to the course control device of the vehicle, a detection information processor that manages modes of operation of the vehicle, the method comprising:
   detecting the standby mode of operation of the vehicle when the vehicle is stopped, and in a substantially fixed arrangement, and substantially immobile relative to a transport carrier on which the vehicle is carried;
   detecting a speed of the vehicle when the vehicle is stopped, and in the substantially fixed arrangement, and substantially immobile relative to the transport carrier on which the vehicle is carried, recorded by at least one of the wheel speed sensors of the vehicle;
   detecting at least one of the wheel speed sensors being in a state of oscillation, over a first predefined time period;
   detecting a non-zero yaw speed of the vehicle, recorded by the yaw speed sensor of the vehicle, corresponding to a relative movement of the vehicle when the vehicle is stopped, and in the substantially fixed arrangement, and substantially immobile relative to the transport carrier on which the vehicle is carried, over a second predefined time period; and
   determining that the vehicle is in the transport situation, based on said detecting the standby mode, said detecting the speed of the vehicle, said detecting at least one of the wheel speed sensors being in the state of oscillation, and said detecting the non-zero yaw speed of the vehicle, wherein in the transportation situation the course control device orders filtering of information from said at least one wheel speed sensor of the vehicle regarding a point of oscillation of the at least one wheel speed sensor in the state of oscillation.

2. The detection method as claimed in claim 1, wherein the standby mode of operation of the vehicle remains for a determined time period after the vehicle is stopped and in the substantially fixed arrangement.

3. The detection method as claimed in one of claim 1, wherein the first predefined time period for detecting the speed of the vehicle is one to several seconds.

4. The detection method as claimed in claim 1, wherein the second predefined time period for detecting the non-zero yaw speed of the vehicle is one second.

5. The detection method as claimed in claim 1, wherein the first predefined time period for detecting the speed of the vehicle and the second predetermined time period for detecting the non-zero yaw speed of the vehicle are substantially identical.

6. A device for detecting the transport situation of the vehicle in the standby mode of operation configured to implement the detection method as claimed in claim 1, the device comprising:
   the wheel speed sensors of the vehicle;
   the vehicle yaw speed sensor;
   the vehicle course control device;
   the detection information processor; and
   means for placing the vehicle in the transport mode in which the information from the wheel speed sensor regarding the point of oscillation of the at least one wheel speed sensor in the state of oscillation is filtered, and for enabling the vehicle to be switched on again.

7. The detection device as claimed in claim 6, wherein the means for placing the vehicle in the transport mode and for enabling the vehicle to be switched on again is a software element of the course control device.

8. The vehicle comprising the detection device as claimed in claim 6.

9. The detection method as claimed in claim 1, further comprising allowing for an exit from the determined transport mode of the vehicle.

10. The detection method as claimed in claim 1, wherein the determined transport mode indicates that the vehicle has been transported for a predetermined period of time.

11. The detection method as claimed in claim 1, wherein the filtering of information from said at least one wheel speed sensor of the vehicle regarding the point of oscillation of the at least one wheel speed sensor in the state of oscillation is such that further activation of an already activated vehicle immobilization device is inhibited.

12. The detection method as claimed in claim 11, wherein the inhibition of further activation of the already activated vehicle immobilization device is inhibition of further tightening of a braking system of the vehicle.

13. The detection method as claimed in claim 11, wherein the inhibition of further activation of the already activated vehicle immobilization device is inhibition of setting the vehicle to a defect mode.

14. The detection method as claimed in claim 1, wherein the filtering of information includes filtering any signals that come at the point of oscillation such that they are recognized as zero speed.

15. The detection method as claimed in claim 1, further comprising preventing tightening of an already tightened vehicle immobilization device based on the filtering of information from said at least one wheel speed sensor of the vehicle regarding the point of oscillation of the at least one wheel speed sensor in the state of oscillation.

* * * * *